United States Patent
Murata (10) Patent No.: US 6,170,013 B1
(45) Date of Patent: Jan. 2, 2001

(54) METHOD AND APPARATUS FOR CONTROLLING ACCESS TO NETWORK INFORMATION SOURCES

(75) Inventor: Richard Y. Murata, San Antonio, TX (US)

(73) Assignee: Nortel Networks Limited, Montreal (CA)

(*) Notice: Under 35 U.S.C. 154(b), the term of this patent shall be extended for 0 days.

(21) Appl. No.: 09/049,855

(22) Filed: Mar. 27, 1998

(51) Int. Cl.[7] .................................................. G06F 15/16

(52) U.S. Cl. ........................................... 709/229; 709/225

(58) Field of Search ...................................... 709/203, 213, 709/219, 229, 246, 225; 711/100, 117, 118, 119, 122, 130, 133, 141, 154, 159, 163, 155

(56) References Cited

U.S. PATENT DOCUMENTS

| 5,859,971 | * | 1/1999 | Bittinger et al. | 709/203 |
| 5,864,852 | * | 1/1999 | Luotonen | 709/246 |
| 5,867,661 | * | 2/1999 | Bittinger et al. | 370/469 |
| 5,991,760 | * | 1/1999 | Gauvin et al. | 709/217 |

OTHER PUBLICATIONS

Instant Internet Software Installation and User's Guide Bay Networks Inc. pp. 1–161, Apr. 1998.*
RFC 2068, "Hypertext Transfer Protocol—Http/1.1", Network Working Group, RFC 2068 pp. 1–162, Jan. 1997.*
Searchedu.com Search Results showing "cache" copies http://www.searchedu.com pp. 1–2, Jan. 14, 2000.*

* cited by examiner

Primary Examiner—Mehmet B. Geckil
(74) Attorney, Agent, or Firm—Blakely Sokoloff Taylor & Zafman LLP (57) ABSTRACT

An apparatus communicatively coupling at least one client to a data network is depicted, the apparatus comprising a storage device, operative to store and retrieve information on demand, and a controller coupled to the storage device. The controller is operative to receive information from the data network on behalf of and in response to a client request, and to provide the requesting client with the received information. In addition, in accordance with the teachings of the present invention, the controller is operative to modify an expiration time of the received information and store the received information in the storage device wherein subsequent requests for the information are satisfied by the information available within the storage device, rather than the data network, until the modified expiration time has expired.

32 Claims, 5 Drawing Sheets

METHOD AND APPARATUS FOR CONTROLLING ACCESS TO NETWORK INFORMATION SOURCES

BACKGROUND OF THE INVENTION

1. Field of the Invention

The present invention relates to the field of networking systems and, in particular, to a method and apparatus for controlling access to network information sources.

2. Background Information

As computer technology has evolved, so too has the use of networks which communicatively couple computer systems together enabling them to communicate with one another. One of the more popular of such computer networks is colloquially referred to as the Internet, which is an internetworking of a number of publicly accessible networks/servers available throughout the world. Individually, the networks/servers comprising the Internet come in a number of alternative topologies, employing a number of alternative communication technologies. However, one reason for the wide-spread acceptance of the Internet is the use of the HyperText Transfer Protocol (HTTP), which effectively renders the transition between the various network topologies and communication technologies virtually transparent to the end-user.

Those that have used the Internet as a source for research can appreciate the wealth of information that the Internet provides. Research that may have previously required days or weeks to accomplish just a couple of years ago, can now be accomplished in hours on the Internet. The wealth of information available on the Internet is not always a positive attribute, as one can quickly become overwhelmed by the sheer volume of information available on the Internet. Moreover, the Internet is a very dynamic source of information. An example of the dynamism of the information available on the Internet may best be illustrated by way of an example, wherein school children are given an assignment by their teacher to determine the "latest" stock price for a local company. If there are thirty (30) students in the class, the teacher may well get thirty different answers to the question obtained by the students at thirty different times throughout the day/week, and all of them would be correct. That is, those attempting to utilize information available via the Internet as a common source of discussion cannot ensure that all parties to the discussion are viewing the exact same material, e.g., same revision, etc., unless they control the source/dissemination of the information.

In addition to the dynamism of the information available on the Internet, another problem faced by many attempting to utilize the Internet as an information tool is the cost associated with its use. In the United States, access to the Internet is typically available at an affordable monthly rate, and sometimes offering unlimited access if a standard telephone line is employed. However, those outside of the United States, or those within the United States accessing the Internet through ISDN or T1 connections, typically have to pay line usage fees on a pay-per-use basis. For example, an Internet user from the Netherlands may well be charged for Internet access in much the same way that they are charged for telephone service, e.g., on a per-minute basis for local and long distance connections utilized.

In an effort to reduce the cost and response time associated with network access through the Internet, network caches are often deployed in the network devices, gateways and proxy servers comprising the routing fabric of the Internet. That is, as each of the interfaces/gateways/proxies along the Internet handle a response from an information source, the interfaces/gateways/proxies responsible for routing the response back through the Internet to the requesting client that have such a network cache, store a copy of the response to satisfy any subsequent requests for the same information. Consequently, subsequent requests for the information need not go all the way to the originating server to satisfy the request, as the request is handled by the network cache of the first interface/gateway/proxy along the routing path of the request that has the information available in a network cache. A number of network device manufacturers have thus begun to incorporate network caches in their product offerings.

However, as will be described in greater detail below, these prior art network devices incorporating network caches have a number of limitations. When responding to a request for information, a host may include an expiration time in the header of the response packet that denotes when the information contained in the response will become stale. Prior art network devices employing network caches do not respond to requests with stale information. Consequently, although a network cache in an interface/gateway/proxy may well have a copy of the requested information, if the expiration time of the information has passed the cached information is determined to be stale and the request is passed along to the "origin server", e.g., the host ultimately responsible for the maintenance of the information, for "fresh" information. Further, there are no restraints on the expiration time that an origin server may give to a response packet. Typically, an origin server may not provide an expiration time at all, wherein it is assumed that the expiration time is the time-stamp of when the response is issued, e.g., it is stale upon issuance. Many of the prior art network devices will not bother to cache stale responses, while others will cache the information, but check with the origin server to determine the last update to the information before providing the information in the cached response. In either case, if the origin server fails to provide an expiration date, prior art network devices must initiate a network access to either obtain fresh information or to determine if an update to the cached information is available. Accordingly, those skilled in the art will appreciate that the use of prior art network devices incorporating network caches does not provide an adequate solution to the problems developed above.

Thus, a method and apparatus for controlling access to network information sources incorporating the ability to selectively maintain and respond to information requests with stale information is required, unencumbered by the deficiencies and inherent limitations commonly associated with the network devices of the prior art. It will be apparent to those skilled in the art, from the description to follow, that the present invention achieves these and other desired results.

SUMMARY OF THE INVENTION

In accordance with the teachings of the present invention, a method and apparatus for controlling access to a network information source is provided. In particular, in accordance with one embodiment of the present invention, an apparatus communicatively coupling at least one client to a data network includes a storage device, operative to store and retrieve information on demand, and a controller coupled to the storage device. The controller is operative to receive information from the data network on behalf of and in response to a client request, and to provide the requesting client with the received information. In addition, in accordance with the teachings of the present invention, the controller is operative to modify an expiration time of the received information and store the received information in the storage device wherein subsequent requests for the information are satisfied by the information available within the storage device, rather than the data network, until the modified expiration time has expired.

BRIEF DESCRIPTION OF DRAWINGS

The present invention will be described by way of exemplary embodiments, but not limitations, illustrated in the accompanying drawing in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers and configurations are set forth in order to provide a thorough understanding of the present invention. However, it will also be apparent to those skilled in the art that the present invention may be practiced without these specific details. In other instances, well known features are omitted or simplified for clarity.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise expressly reserves all rights whatsoever in said copyright works.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexers, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Figure 1:
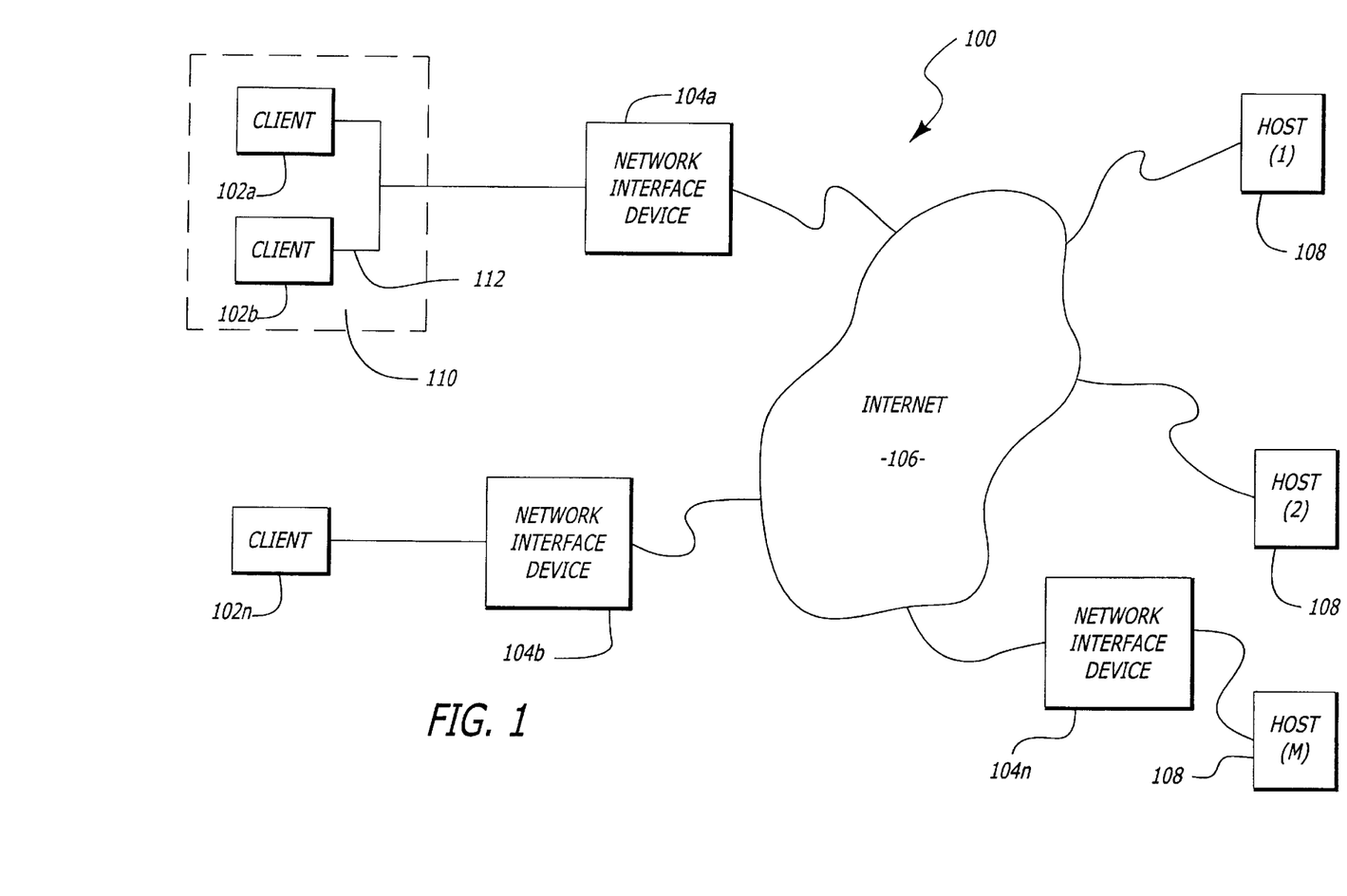
FIG. 1 illustrates a block diagram of an example network topology within which the teachings of the present invention may be practiced, in accordance with one embodiment of the present invention.

With reference to FIG. 1, an operating environment within which the teachings of the present invention may be practiced will be developed more fully in accordance with the block diagram of example network 100. The example network topology of network 100 includes multiple clients 102a–102n, multiple (M) hosts 108, Internet 106 and multiple network interface devices 104a–104n incorporating the teachings of the present invention. As depicted, network 100 illustrated in the example embodiment of FIG. 1 is much like the typical prior art network described above, with the exception of network devices 104a–104n incorporating the teachings of the present invention. More specifically, as will be described in greater detail below, network devices 104a–104n incorporating the teachings of the present invention are individually operative to modify the expiration time of a received response, in accordance with a predetermined caching strategy, to ensure that the response is retained in the network cache of network devices 104a–104n to satisfy future requests for the same information, without regard to the original expiration time set by the originating server or whether the information has since become stale. Thus it will be apparent, from the descriptions to follow, that network devices 104a–104n incorporating the teachings of the present invention are individually operative to cache information beyond the expiration time assigned by the "origin server", e.g., host 108, to reduce the need for costly network accesses, and to mitigate the potential for confusion caused by the dynamism of the information available via Internet 106.

As used herein, clients 102 can be any of a wide range of computing devices known in the art which enable a user to access Internet 106. In one embodiment, for example, clients 102 are client computers interconnected via a local backbone (e.g., Ethernet, Token Ring, etc.) 112 to a subnetwork 110, such as a local area network (LAN), wide area network (WAN), wide area information source (WAIS), and the like. In an alternate embodiment, client 102 is an electronic appliance, e.g., a webTV™ Internet Terminal available from Sony Electronics, Inc. of Park Ridge, N.J., that enables one to utilize the resources of Internet 106 without the need of a full-featured computer system.

Each host system 108 is typically a computer system which can be accessed by clients 102. According to one embodiment, each host 108 includes one or more HyperText Markup Language (HTML) compatible documents (e.g., web-pages), which can be accessed via HTTP and displayed by an HTML-compatible user agent (e.g., browser) operating on a requesting client, e.g., clients 102. In accordance with the HTTP protocol, to obtain a copy of an HTML document from host 108, client 102 issues a "request" to host 108 for a copy of the desired information, e.g., a web-page, whereafter either host 108 or an intervening network device 104 having the desired information stored in a network cache, issues a "response" to the requesting client, e.g., client 102, that includes the requested information. It is to be appreciated that although clients 102 and hosts 108 are illustrated as being different machines, a single hardware system may be both a client 102 or a host 108, at different times. That is, if a hardware system is initiating an access for information from another system, then the hardware system is referred to as a client. Alternatively, if a hardware system is being accessed by another system to obtain information, then the hardware system is referred to as a host.

As alluded to above, Internet 106 is a combination of multiple conventional hardware components, including computer systems, routers, repeaters, gateways, and switches interconnected throughout the world with wireline and wireless (e.g., satellite, terrestrial, and the like) communication connections. These hardware components are organized hierarchically to provide multiple logical levels of networks, which route data from one computer system to another. According to one implementation, data is transferred between computer systems using the well-known Transmission Control Protocol/internet Protocol (TCP/IP) protocol. Data is generally transferred between network elements in units commonly referred to as "packets" or "datagrams". Typically, each packet includes data, a source address and a target address. As will be described in greater detail below, additional control information, generally included in a header, may also be included in the packet. The number of bytes of data contained within a packet is dependent upon the communication resources of the client, the host and the network protocol employed.

The communication links illustrated in FIG. 1 may be any of a wide range of conventional wireline and wireless communication media, and may be different for different clients 102, hosts 108 and network devices 104. For example, a communication link may be a cable, a fiber optic cable, or may represent a nonphysical medium transmitting electromagnetic signals in the electromagnetic spectrum. Additionally, a wireless communication link may also include any number of conventional routing or repeating devices, such as satellites or electromagnetic signal repeaters or basestations.

Figure 2:
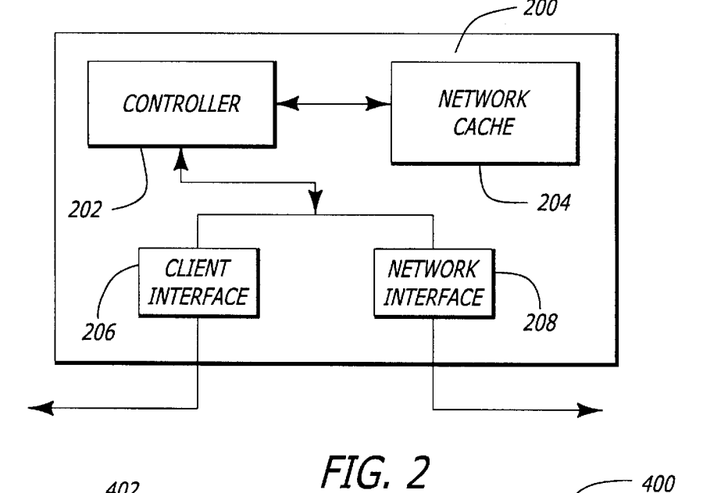
FIG. 2 illustrates a block diagram of a network device incorporating the teachings of the present invention, in accordance with one embodiment of the present invention.

Having introduced the operating environment for the present invention, a block diagram of an example network device incorporating the teachings of the present invention will now be described with reference to FIG. 2. As depicted, FIG. 2 illustrates a block diagram of an example network interface device 200 incorporating the teachings of the present invention, in accordance with one embodiment of the present invention. In one embodiment, network device 200 may well be beneficially incorporated into network 100 as one or more of network devices 104a–104n.

In accordance with the illustrated example embodiment of FIG. 2, network device 200 is shown comprising controller 202, network cache 204, client interface 206 and network communication interface 208 cooperatively coupled as depicted. As depicted, controller 202 accesses internal or external controller-executable, administrator (e.g., user-definable) instructions for implementing a network access strategy. As known in the art, client interface 206 facilitates communication with communicatively coupled client(s) 102, while network communication interface 208 facilitates communication with data networks such as, for example, Internet 106. As alluded to above, client interface 206 and network communication interface 208 are intended to represent any of a number of communication interfaces supporting any of a number of alternative communication/data networking protocols. In particular, client interface 206 and network communication interface 208 are intended to represent any of a number of wireline and wireless communication media through which these interfaces may communicate with clients 102, client subnetworks 110, and Internet 106. In one embodiment, for example, network device 200 is the Instant Internet[100]™ network device commonly available from Bay Networks, Inc. of Santa Clara, Calif.

Except for the teachings of the present invention, to be described more fully below, the term network device is broadly employed to describe any of a number of alternative network devices commonly known and used in the data networking arts to support communication between clients and a data network. Consequently, in one embodiment, network device 200 is a gateway server, which operates as an intermediary for some other server. In an alternate embodiment, for example, network device 200 is an Internet Service Provider (ISP) server operating as a proxy, i.e., an intermediary program which acts as both a server and a client for the purpose of making requests on behalf of other clients. In yet another embodiment, network device 200 is a tunnel, or an intermediary program acting as a blind relay between two connections. Except for the teachings of the present invention, network device 200 is intended to represent any of a number of suitable conventional network devices. Regardless of form, network device 200 incorporating the teachings of the present invention is operative to store and retain information received in response to client requests beyond the original expiration time assigned by the responding server, in accordance with an administrator-definable network access strategy, to be described in greater detail below.

In accordance with the teachings of the present invention, controller 202 of network device 200 is operative to analyze response messages received at network communication interface 208 to identify an expiration time within the response message, if any. If controller 202 determines that the expiration time of the response message issued by the origin server, e.g., host 108, does not conform to the administrator-definable network access strategy, controller 202 is operative to modify the expiration time of the response message before caching the response message in network cache 204, in accordance with the teachings of the present invention. As used herein, controller 202 is intended to represent any of a number of microprocessors, microcontrollers, programmable logic devices (PLDs), application specific integrated circuits (ASICs) and the like. Thus, in accordance with the teachings of the present invention to be described more fully below, network device 200 incorporating the teachings of the present invention is operative to retain response messages beyond their expiration time to satisfy subsequent client requests with potentially stale information to reduce the need for network accesses to satisfy such requests.

As described herein, network cache 204 is intended to represent any of a number of alternative storage media. In one embodiment, for example, network cache 204 is a memory device, or an array of such devices, such as a random access memory (RAM), flash memory device, or the like. In one embodiment, network cache 204 is a magnetic storage media such as a hard disk, redundant array of inexpensive disks (RAID) system, re-writeable compact disk, tape media, or the like. In one embodiment, network cache 204 is a RAM disk, e.g., an array of RAM devices partitioned and functioning as a fast hard disk drive. In one embodiment, network cache 204 employs a first-in first-out (FIFO) caching strategy, wherein the oldest of the cached response messages are purged to make room for newly received response messages. In another embodiment, network cache 204 employs a pseudo-FIFO strategy based, in part, on the expiration time of the cached response. In an alternate embodiment, network cache 204 employs a least recently used (LRU), or pseudo-LRU caching strategy. In accordance with the LRU caching strategy, cached response messages are prioritized according to the number and frequency of times they are accessed to satisfy client requests, wherein the cached response message with the lowest priority are purged to make room for new response messages. Thus, those skilled in the art will appreciate that any of a number of storage media and caching strategies may well be employed without deviating from the spirit and scope of the present invention.

Figure 3:
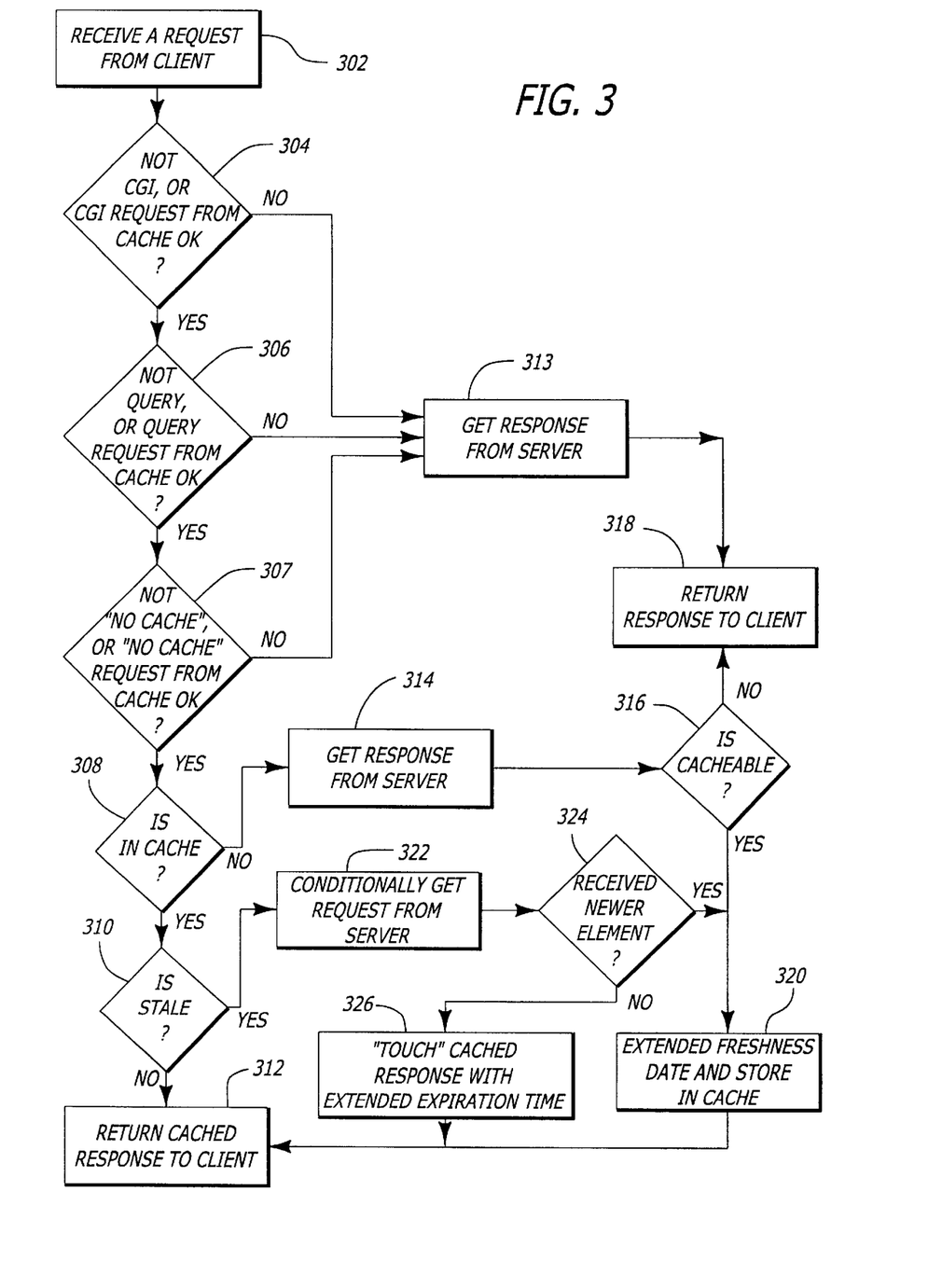
FIG. 3 illustrates a flow chart of an example method for controlling access to network information sources incorporating the teachings of the present invention, in accordance with one embodiment of the present invention.

Given the foregoing architectural description, the operation of example network device 200 incorporating the teachings of the present invention will now be developed with reference to the flow chart depicted in FIG. 3. In particular, an example method for controlling access to network information sources will be developed with reference to the flow chart depicted in FIG. 3, in accordance with one embodiment of the present invention.

Figure 4A:
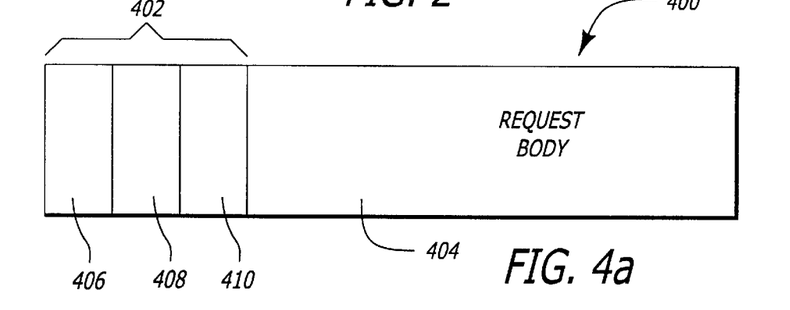
FIGS. 4a and 4b depict an illustration of a network request and a network response, respectively, suitable for use to communicate information within the example data network depicted in FIG. 1.
Figure 4B:
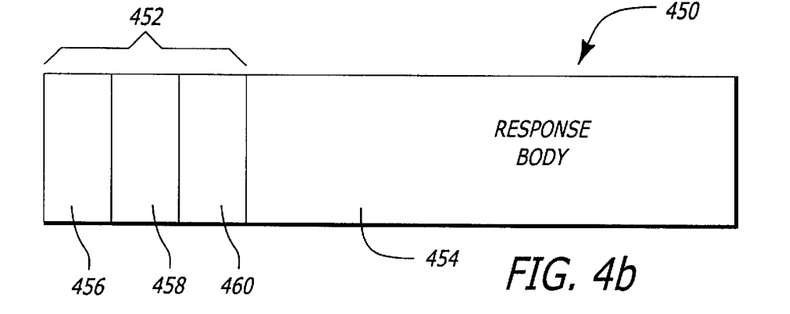

Before delving into the description of FIG. 3, however, it will be useful to briefly introduce an example format for the request messages and response messages referenced herein. Thus, for ease of explanation and not limitation, an example request message and response message are illustrated in FIGS. 4a and 4b, respectively. As depicted, request message 400 is shown comprising request header fields 402 and the request entity body field 404. In one embodiment, request header fields 402 include general header field 406, request header field 408 and entity header field 410. Similarly, response message 450 is shown comprising response header fields 452 and response entity body field 454, wherein response header fields 452 include general header field 456, response header field 458 and entity header field 460.

As used herein, general header fields 406,456 include the source address of the requesting client, e.g., client 102a and the target address of the origin server, e.g., host (M) 108. Request header field 408 includes information related to the nature of the request. In one embodiment, for example, request header field 408 may include data directing intermediary network devices to disregard any information contained within a network cache, and to forward request message 400 to the identified target address to satisfy the request from the addressed host (M) 108. The HTTP protocol defined in, for example, Request For Comment (RFC) 1945 (HTTP 1.0, May 1996) and RFC 2068 (HTTP 1.1 Feb. 20, 1998 (Standards Track)), includes the option of issuing a no__cache directive in the request header field 408 that instructs intermediary network devices 104 handling request message 400 to simply forward the request to the addressed host 108, disregarding any information stored within a network cache. Similarly, the response header field 458 includes information related to the nature of the response. In one embodiment, for example, an expiration time for the information is provided in response header field 458 by the origin server denoting when the information contained in the response body 454 will become stale. In one embodiment, the response header field 458 contains information as to the last update of the information contained within the response body 454.

Entity header fields 410 and 460 of the request 400 and response 450 messages, respectively, are used in accordance with the standard of the HTTP protocol to describe the content of the entity body. For example, in one embodiment entity header fields 410 and 460 may well describe the type of encoding used in the entity body field 404 or 454, respectively. The entity body fields 404 and 454 of request 400 and response 454 messages, respectively, contain the body of the request/response information to be communicated within the message.

Having introduced the communication datagrams of the Internet in FIGS. 4a and 4b, respectively, attention is redirected to the flow chart of FIG. 3, wherein one embodiment of the teachings of the present invention are developed in accordance with an example Internet communication session wherein a user of client 102a wants to download a file (web-page, or other HTML file) from an origin server, e.g., host (M) 108, via Internet 106. As alluded to above, to retrieve information from the origin server, a user agent, e.g., web browser (not shown) operating on client 102a issues a request (or, a "query") message for such information. Thus, the method of FIG. 3 begins with network device 104a incorporated with the teachings of the present invention receiving the request message (e.g., request message 400) issued by client 102a for information from origin server (M) 108, step 302.

In step 304, network device 104a determines whether the information requested denotes a common gateway interface (CGI) and, if so, whether the administrator-defined network access strategy employed on network device 104a requires CGI requests to be handled from network cache 204, if available. Those skilled in the art will appreciate that a common gateway interface (CGI) defines a particular network resource, e.g., host 108, to which request messages are to be sent, regardless of whether a response to the request is available from within the network cache of an intermediary network device. In one embodiment, for example, a request message 400 denoting a CGI includes the reference "cgi-bin" in the Uniform Resource Locator (URL) defining the information to be retrieved from the origin server. In one embodiment of the present invention, controller 202 analyzes the URL of the request message to determine whether a CGI is defined. That is, the network access strategy employed on network device 104a can be configured to satisfy CGI requests from network cache 204, if available, to beneficially minimize network accesses, in accordance with one embodiment of the present invention.

If controller 202 of network device 104a determines in step 304 that the requested information does contain a CGI reference, and the predetermined network access strategy does not permit such requests be satisfied from network cache 204, network device 104a forwards the request message issued by client 102a to host (M) 108 via the resources of Internet 106, step 313. In response to the issued request message, network device 104a receives a response message from the origin server (host (M) 108) and forwards the response to the requesting client, step 318.

Alternatively, if it is determined in step 304 that the information request does not define a CGI, or the network access strategy dictates that requests defining a CGI must be handled by network cache 204, network device 104a next determines how best to handle the request message in accordance with the network access strategy, step 306.

Similarly, in step 306, network device 104a determines whether the information requested denotes a query request and, if so, whether the administrator-defined network access strategy employed on network device 104a requires query requests to be handled from network cache 204, if available. Those skilled in the art will appreciate that a query request is often used to define a network query request, e.g., when a user of a browser wants to search the network for a particular topic of interest. In one embodiment, for example, a request message 400 denoting a query request include a question mark "?" after the requested information in the Uniform Resource Locator (URL) defining the information to be retrieved from the origin server. In one embodiment of the present invention, controller 202 analyzes the URL of the request message to determine whether a query is defined. That is, the network access strategy employed on network device 104*a* can be configured to satisfy query requests from network cache 204, if available, to beneficially minimize network accesses, in accordance with one embodiment of the present invention.

If controller 202 of network device 104*a* determines in step 306 that the requested information does contain a query request, and the predetermined network access strategy does not permit such requests be satisfied from network cache 204, network device 104*a* forwards the request message issued by client 102*a* to host (M) 108 via the resources of Internet 106, step 313. In response to the issued request message, network device 104*a* receives a response message from the origin server (host (M) 108) and forwards the response to the requesting client, step 318.

Alternatively, if it is determined in step 306 that the information request does not define a query request, or the network access strategy dictates that query requests must be handled by network cache 204, network device 104*a* next determines how best to handle the request message in accordance with the network access strategy, step 307.

Some browsers permit a user to specify that the issued request is to be handled by none other than the origin server. That is, in accordance with certain network protocols, a user agent may embed a "no_cache" directive within request header field 408, directing intermediary servers to ignore the network caches for purposes of responding to the particular request. In one embodiment of the present invention, controller 202 determines whether the request header field 408 contains a no_cache directive, step 307, and handles the request in accordance with the administrator defined network access strategy. That is, in accordance with the teachings of the present invention, network device 104*a* may be configured to ignore such no_cache directives and satisfy the request from network cache 204, as available. Alternatively, the network access strategy employed on network device 104*a* may well define that such no_cache directives are to be satisfied from the origin server, and the process continues with step 313, described above.

Additionally, an administrator may configure network device 104*a* to pass request messages to the origin server only if they cannot be satisfied from within network cache 204. Thus, in step 308 network device 104*a* determines whether the requested information is available locally, e.g., within network cache 204. If the requested information is not available within network cache 204, the request message is forwarded to the origin server via Internet 106, step 314. In response to the issued request message, network device 104*a* receives a response message from the origin server (hostM 108) and determines whether the received response message is cacheable, step 316. If network device 104*a* determines that the response message is not cacheable, the response message is simply forwarded to requesting client 102*a* to satisfy the issued request message, step 318.

Alternatively, if network device 104*a* determines in step 316 that the received response message is cacheable, network device 104*a* extends the expiration time (e.g., the "freshness" time) provided by the origin server (e.g., host (M) 108), if any, in accordance with the network access strategy and stores the received response with the updated expiration time in network cache 204 in accordance with the teachings of the present invention, step 320. Having extended the expiration time of the response message in step 320, the response is forwarded to the requesting client 102*a* to satisfy its request message, step 312.

If, in step 308, network device 104*a* determines that the requested information is available locally, e.g., within network cache 204, a determination is made as to whether such information is stale, step 310. That is, controller 202 of network device 104*a* analyzes the expiration time of the response message cached within network cache 204 to determine whether the expiration time has lapsed. In accordance with one embodiment of the present invention, if the expiration time has lapsed, network device 104*a* issues a request for an update from origin server 108, step 322. When a response to the update request is received, controller 202 determines whether the received response is a "newer" revision of the information by comparing the "last update" time of the new version against that of the cached version of the information, step 324. If the new version and the cached version of the information contain the same "last update", i.e., they are the same revision, controller 202 updates the cached response with an extended expiration time, step 326 and returns the cached response to requesting client 102*a*, step 326. In an alternate embodiment, controller 202 issues a request for updated information from origin server 108 including in request header field 406 the "If_Modified_Since" parameter and the time-stamp of the cached information. Accordingly, if origin server 108 does not have a more recent version of the cached information, origin server issues a response containing a "not_modified" indication, e.g., 304, without a response entity body field.

If, however, the new revision received in step 324 carries a later revision date than the cached version, controller 202 analyzes the expiration time of the response message and updates it in accordance with the administrator-definable network access strategy before storing the response message in network cache 204, step 320. Once cached, a copy of the response message is sent to requesting client 102*a* to satisfy the request message, step 312.

Thus, one method for implementing the teachings of the present invention has been described with reference to FIGS. 1–4. Those skilled in the art will appreciate, however, that modifications and alterations to the network topology, caching strategy and the network access strategy may be made without deviating from the spirit and scope of the present invention. For example, in addition to the teachings above in FIG. 3, controller 202 may selectively modify the expiration time of a response message in step 320 based on the source of the response message, in accordance with the administrator defined network access strategy employed by network device 200. In particular, network device 200 may well include look-up tables with predefined host indicators, e.g., URLs, network address, and the like, having different priority codes assigned thereto. Accordingly, response packets emanating from a news agency may have the original expiration time extended by four hours, while response packets emanating from a stock market reporting agency will not have the expiration time extended at all. In another embodiment, the determination by controller 202 as to whether a request is satisfied from network cache 204 or the origin server is a function of the identity of the requesting client. That is, a similar look-up table may be employed by network device 200 incorporating the teachings of the present invention to assign different priority codes to different users, or classes of users, on a subnetwork (e.g., LAN). Thus, a chief financial officer of a corporation will be permitted access to current stock reports, while engineers on the same network utilizing the same network device 200 will be limited to one such access per day. In another embodiment, a client paying for premium service from an ISP may always get updated information from the Internet, while a client paying for basic service will always get cached information, as it is available, regardless of the expiration time of the information. Consequently, such modifications and alterations are anticipated within the spirit and scope of the present invention.

Figure 5:
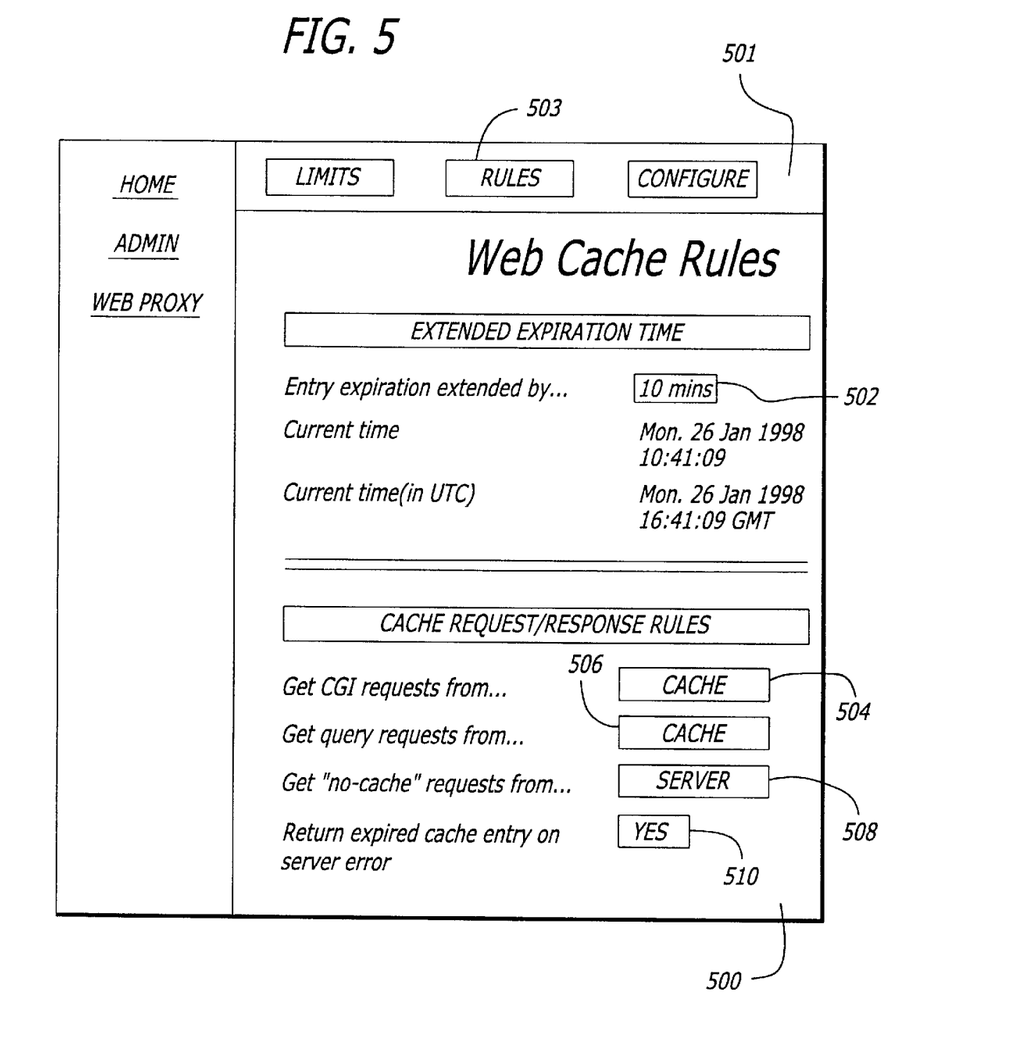
FIG. 5 illustrates an example of a graphical user interface employed by network device of FIG. 2 to set the network access strategy of the network device, in accordance with one embodiment of the present invention.

Having described an example network device incorporating the teachings of the present invention with reference to FIG. 2, and a method of operation in FIG. 3, one embodiment of an example graphical user interface (GUI) for configuring the network access strategy of network device 200 is provided with reference to FIG. 5. Accordingly, FIG. 5 illustrates an example network access manager GUI 500 wherein an administrator of network device 200 may define the network access strategy of network device 200 incorporated with the teachings of the present invention. In accordance with the illustrated example embodiment of FIG. 5, network access manager GUI 500 includes expiration modification field 502, CGI field 504, query request field 506, no_cache request field 508 and error field 510.

In accordance with the illustrated example embodiment, by selecting rules modification field 503 of menu 501, a user of network device 200, e.g., a network administrator, employing network access manager GUI 500 can extend the expiration time of all response messages received by modifying the value in expiration modification field 502. Similarly, the user may define whether CGI requests, query requests and no_cache requests are handled by a network access, or from network cache 204 by modifying fields 504–508, accordingly. Further, network access manager GUI 500 may also be employed to manage error conditions with error field 510.

Figure 6:
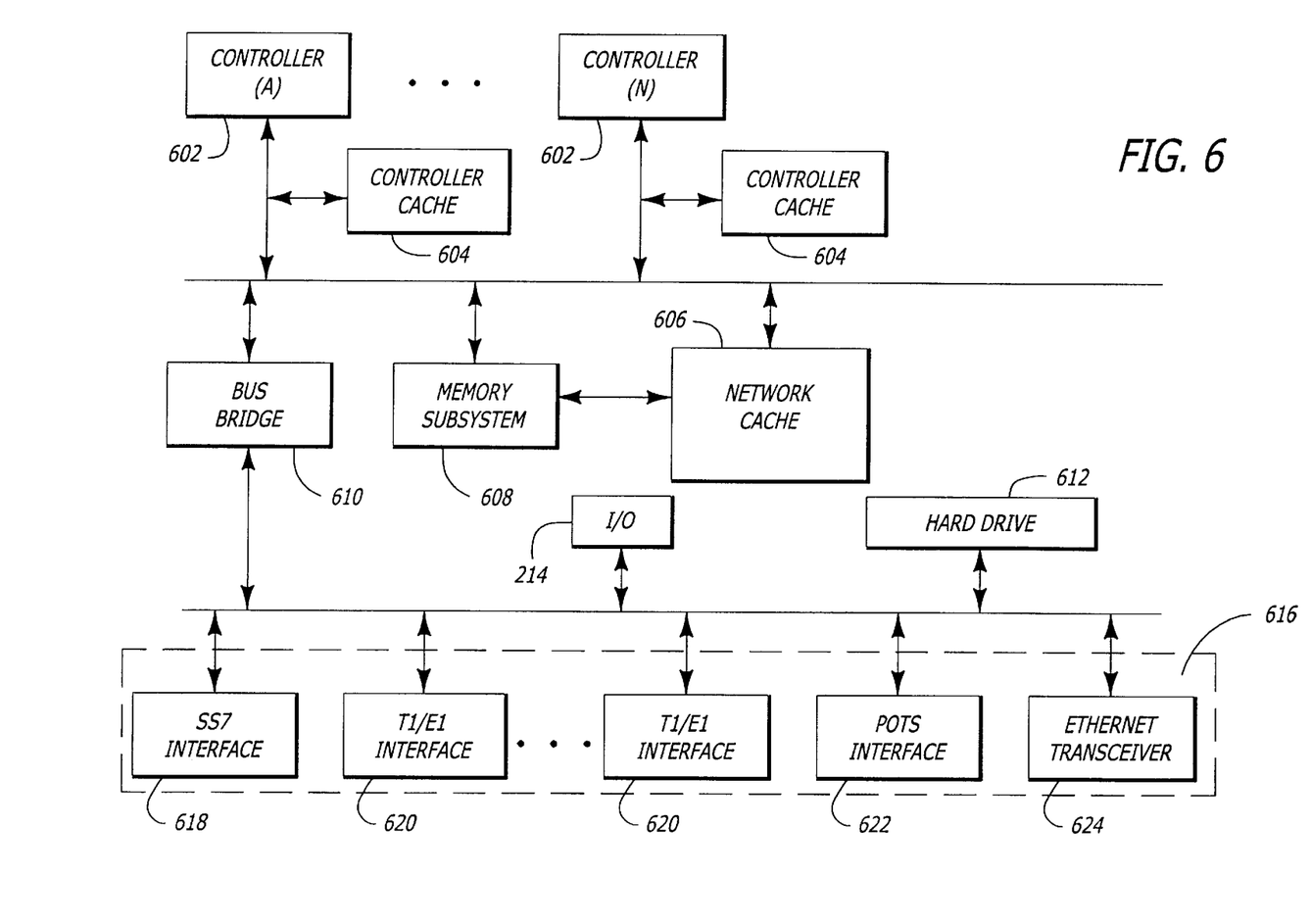
FIG. 6 illustrates an block diagram of an example network device incorporating the teachings of the present invention, in accordance with another embodiment of the present invention.

Turning to FIG. 6, an alternate embodiment of an example network interface device incorporating the teachings of the present invention is depicted. In accordance with the illustrated example embodiment of FIG. 6, network device 600 comprises controller(s) 602 with associated cache(s) 604, bus bridge 610, communication interfaces 616, memory subsystem 608 and network cache 606 incorporated with the teachings of the present invention, coupled as shown. In particular, in accordance with the teachings of the present invention, controller(s) 602, memory subsystem 608 and network cache 606 cooperatively function to modify the expiration time of responses received from the Internet, in accordance with an administrator defined network access strategy.

In addition to controller 602, memory subsystem 608 and network cache 606 cooperatively employed to cache received response messages beyond their initial expiration time, in one embodiment network device 600 also includes communication interfaces 616, input/output (I/O) devices 214, hard disk 212 and bus bridge 210. The function of I/O devices 214, hard disk 212 and bus bridge 210 are known, and need not be further described. In one embodiment, network device 600 is a computer system having a large amount of storage space (typically on the order of hundreds of gigabytes or terabytes), with multiple communication interfaces 616 which support multiple simultaneous virtual connections between clients 102 and Internet 106.

Communication interfaces 616 are intended to represent a number of alternative communication interfaces which enable network device 600 to communicate with Internet components via any of a number of alternative communication technologies. As illustrated, communication interfaces 616 include, for example, signaling system 7 (SS7) interface 618, T1/E1 interface(s) 620, plain old telephone services (POTS) interface 622 and Ethernet transceiver 624. The function of such communication interfaces 616 is well known, and thus need not be further described here.

Figure 7:
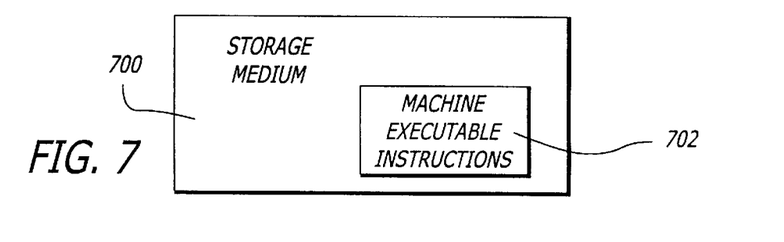
FIG. 7 illustrates a block diagram of a storage medium having stored therein a plurality of machine executable instructions for controlling access to a network information source, in accordance with one embodiment of the present invention.

In another embodiment of the present invention, the teachings of the present invention for controlling access to network information sources are embodied in software. Accordingly, FIG. 7 illustrates an example storage medium 700 having stored thereon machine executable instructions 702 which, when processed by a controller transforms an appropriate configured machine executing machine executable instructions 702 into a network device incorporating the teachings of the present invention. In accordance with the illustrated example embodiment of FIG. 7, storage medium 700 is intended to represent any of a number of alternative storage media including, but not limited to, floppy disks, magnetic tape, compact disk, digital versatile disk, optical disks, and the like. Further, those skilled in the art will appreciate that the machine executable instructions need not be located within the an executing machine itself, but may be accessed from coupled network devices.

In addition to the embodiments described above, those skilled in the art will appreciate that the teachings of the present invention may well be integrated with a single integrated circuit (not shown). That is, those skilled in the art will appreciate that advances in IC fabrication technology now enable complex systems to be integrated onto a single IC. Thus, in accordance with one embodiment of the present invention, the teachings of the present invention may be practiced within an application specific integrated circuits (ASIC), programmable logic devices (PLD), microcontroller, processor and the like.

While the innovative features for controlling access to network information sources of the present invention have been described in terms of the above illustrated embodiments, those skilled in the art will recognize that the invention is not limited to the embodiments described. The present invention can be practiced with modification and alteration within the spirit and scope of the appended claims. In particular, the present invention may be practiced with other features and/or feature settings. Particular examples of other features include but are not limited to transaction communication protocols and architectural attributes. Accordingly, the description is to be regarded as illustrative instead of restrictive on the present invention.

Thus, a method and apparatus for controlling access to network information sources incorporating the teachings of the present invention has been described.

What is claimed is:

1. An apparatus communicatively coupling at least one client to a data network, the apparatus comprising:

a storage device, operative to store and retrieve information on demand;

a controller, coupled to the storage device, operative to receive information from the data network on behalf of and in response to a client request and to provide the requesting client with the received information, wherein the controller is operative to modify an expiration time of the received information and store the received information in the storage device, wherein the subsequent requests for the information are satisfied by retrieving the information from the storage device at least until the modified expiration time has passed and a look-up table comprising a plurality of attributes of potential responses assigned to corresponding expiration time modifiers, wherein said controller is operative to determine which one of said plurality of attributes said received information corresponds to, and operative to modify said expiration time of said received information based on a corresponding expiration time modifier.

2. The apparatus of claim 1, wherein the storage device is a cache memory device.

3. The apparatus of claim 1, wherein the information is web page information.

4. The apparatus of claim 1, wherein the controller is operative to identify the expiration time embedded within the received information in accordance with a network protocol.

5. The apparatus of claim 4, wherein the controller is operative to ignore no_cache directives embedded within the client request in accordance with a network access strategy.

6. The apparatus of claim 4, wherein the controller is operative to ignore common gateway interface (CGI) directives embedded in the client request in accordance with a network access strategy.

7. The apparatus of claim 4, wherein the controller is operative to ignore query requests embedded in the client request in accordance with a network access strategy.

8. The apparatus of claim 1, wherein subsequent requests for the information by a client that indicate that the information is to be retrieved from the data network are, nonetheless, disregarded by the apparatus if the modified expiration time has not yet expired, and the information supplied to the client in response to such subsequent requests are satisfied by retrieving the information from the storage device of the apparatus.

9. The apparatus of claim 1, wherein the storage device is a random access memory (RAM) memory device configured as a RAM disk.

10. The apparatus of claim 1, wherein as the storage device becomes full, the controller is operative to purge information from the storage device on a first-in-first-out (FIFO) basis.

11. The apparatus of claim 1, wherein as the storage device becomes full, the controller is operative to purge information from the storage device on a least-recently used (LRU) basis.

12. The apparatus of claim 1, wherein modification of the expiration time encompasses both modifying a preexisting expiration time and creating a new expiration time.

13. The apparatus of claim 1, wherein said attribute of said received information relates to a source of said received information.

14. The apparatus of claim 1, wherein said attribute of said received information relates to a class to which said client belong.

15. The apparatus of claim 14, wherein said attribute of said received information relates to whether said client has paid to belong to said class.

16. A method for controlling access to network information sources, the method comprising:
(a) receiving a request from a communicatively coupled client, and processing the request in accordance with a network access strategy;
(b) receiving a response from a network information source to a request from a client that could not be satisfied by information available in a local storage device;
(c) analyzing an expiration time of the received response to determine whether the expiration time conforms with a network access strategy; and
(d) modifying the expiration time of the received response based, at least in part, on whether the expiration time of the received response conforms with the network access strategy, wherein said modifying step comprises:
(d-1) determining an attribute of said received response:
(d-2) searching a look-up table comprising a plurality of different response attributes and assigned expiration time modifiers, for an expiration time modifier assigned to said received response attribute, and
(d-3) modifying the expiration time of the received response based on said expiration time modifier.

17. The method of claim 16, further comprising:
(e) storing a response in the storage device which conforms with the network access strategy.

18. The method of claim 17, further comprising:
(f) satisfying subsequent requests for the requested information from the response stored in the storage device which conforms with the network access strategy at least until the expiration time of the response has lapsed.

19. The method of claim 16, wherein storing a response (e) comprises storing the received response with the modified expiration time if it is determined that the expiration time of the received response does not conform with the network access strategy.

20. The method of claim 14, wherein storing a response (e) comprises storing the received response if it is determined that the expiration time of the received response conforms with the network access strategy.

21. The method of claim 16, wherein receiving a response (b) further comprises transmitting the response to the requesting client.

22. The method of claim 16, wherein step (a) comprises:
ignoring a common gateway interface (CGI) directive embedded within the client request in accordance with the network access strategy.

23. The method of claim 16, wherein step (a) comprises:
ignoring a no_cache directive embedded within the client request, in accordance with the network access strategy.

24. The method of claim 16, wherein step (a) comprises:
ignoring a query request directive embedded within the client request, in accordance with the network access strategy.

25. The method of claim 16, wherein said attribute of said received information relates to a source of said received information.

26. The method of claim 16, wherein said attribute of said received information relates to a class to which said client belong.

27. The method of claim 26, wherein said attribute of said received information relates to whether said client has paid to belong to said class.

28. A storage medium having stored thereon a plurality of machine executable instructions for controlling access to network information sources, the plurality of machine executable instructions executable to implement a network access management function operative to analyze an expiration time of a response received to a client request, and modification function operative to modify the expiration time of the received response based, at least in part, on whether the expiration time conforms with a user definable network access strategy, wherein said modification function is operative to:

determine an attribute of said received response;

search a look-up table comprising a plurality of different response attributes and expiration time modifiers, for an expiration time modifier assigned to said received response attribute; and modify the expiration time of the received response based on said expiration time modifier.

29. The storage medium of claim 28, further comprising a write function to store responses having an expiration time conforming with the network access strategy.

30. The storage medium of claim 28, wherein said attribute of said received information relates to a source of said received information.

31. The storage medium of claim 28, wherein said attribute of said received information relates to a class to which said client belong.

32. The storage of claim 31, wherein said attribute of said received information relates to whether said client has paid to belong to said class.

* * * * *

UNITED STATES PATENT AND TRADEMARK OFFICE
CERTIFICATE OF CORRECTION

PATENT NO.   : 6,170,013 B1  
DATED        : January 2, 2001  
INVENTOR(S)  : Richard Y. Murata Page 1 of 1

It is certified that error appears in the above-identified patent and that said Letters Patent is hereby corrected as shown below:

<u>Page 14, claim 19,</u>  
Line 1, please delete "16" and insert in lieu thereof -- 17 --.

<u>Page 14, claim 20,</u>  
Line 1, please delete "14" and insert in lieu thereof -- 17 --.

Signed and Sealed this

Twenty-third Day of October, 2001

Attest:

NICHOLAS P. GODICI  
*Acting Director of the United States Patent and Trademark Office*

*Attesting Officer*